United States Patent
Cai et al.

(10) Patent No.: US 8,468,412 B2
(45) Date of Patent: Jun. 18, 2013

(54) DOWNLINK TRANSMISSIONS FOR TYPE 2 RELAY

(75) Inventors: Zhijun Cai, Euless, TX (US); Chandra S. Bontu, Ottawa (CA); Yi Yu, Irving, TX (US); Mo-Han Fong, Ottawa (CA); Sophie Vrzic, Ottawa (CA); James Earl Womack, Bedford, TX (US); Andrew Mark Earnshaw, Kanata (CA); Yi Song, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 414 days.

(21) Appl. No.: 12/817,077

(22) Filed: Jun. 16, 2010

(65) Prior Publication Data

US 2010/0325506 A1  Dec. 23, 2010

Related U.S. Application Data

(60) Provisional application No. 61/218,907, filed on Jun. 19, 2009.

(51) Int. Cl.
*H04L 1/08*     (2006.01)
*H04B 7/14*     (2006.01)
*H04B 3/26*     (2006.01)

(52) U.S. Cl.
USPC ............................. 714/748; 370/315; 375/211

(58) Field of Classification Search
USPC .................... 714/748, 752; 370/315; 375/211
See application file for complete search history.

(56) References Cited

U.S. PATENT DOCUMENTS

| | | | | |
|---|---|---|---|---|
| 4,882,765 A | * | 11/1989 | Maxwell et al. | 455/18 |
| 5,133,080 A | * | 7/1992 | Borras | 455/9 |
| 5,621,732 A | * | 4/1997 | Osawa | 370/346 |
| 5,898,679 A | * | 4/1999 | Brederveld et al. | 370/315 |
| 6,188,719 B1 | * | 2/2001 | Collomby | 375/211 |
| 7,577,399 B2 | * | 8/2009 | Eichinger et al. | 455/11.1 |
| 7,890,049 B2 | * | 2/2011 | Chang et al. | 455/11.1 |
| 7,969,940 B2 | * | 6/2011 | Kim et al. | 370/329 |

(Continued)

FOREIGN PATENT DOCUMENTS

| | | |
|---|---|---|
| EP | 0851632 A2 | 12/1997 |
| EP | 1890444 A2 | 7/2007 |

(Continued)

OTHER PUBLICATIONS

Can, Basak, et al.; Title: Efficient Cooperative Diversity Schemes and Radio Resource Allocation for IEEE 802.16j; IEEE, Mar. 31, 2008; pp. 36-41.

(Continued)

*Primary Examiner* — James C Kerveros
(74) *Attorney, Agent, or Firm* — Conley Rose, P.C.; J. Robert Brown, Jr.

(57) ABSTRACT

A method for transmitting data to a user agent. The method includes a relay node receiving information from an access node, the information containing the data that is to be transmitted to the user agent and control information that the access node will use to transmit the data to the user agent. The method further includes the relay node transmitting the data to the user agent at the time the access node transmits the data to the user agent, the relay node using the control information that the access node uses to transmit the data to the user agent.

43 Claims, 4 Drawing Sheets

U.S. PATENT DOCUMENTS

| | | | |
|---|---|---|---|
| 7,975,199 | B2 | 7/2011 | Chindapol et al. |
| 7,995,512 | B2 * | 8/2011 | Kim et al. ............... 370/315 |
| 8,014,336 | B2 * | 9/2011 | Bertinelli et al. ........... 370/315 |
| 8,244,266 | B2 * | 8/2012 | Song et al. ............ 455/452.1 |
| 2007/0070954 | A1 | 3/2007 | Kim et al. |
| 2007/0087691 | A1 * | 4/2007 | Lee et al. ............. 455/13.2 |
| 2008/0108304 | A1 | 5/2008 | Suga |
| 2008/0247354 | A1 | 10/2008 | Hsieh et al. |
| 2009/0003260 | A1 | 1/2009 | Guo et al. |
| 2009/0122747 | A1 * | 5/2009 | In et al. ............. 370/315 |
| 2009/0217119 | A1 | 8/2009 | Zhang et al. |
| 2009/0253429 | A1 * | 10/2009 | Lee et al. ............. 455/434 |

FOREIGN PATENT DOCUMENTS

| | | |
|---|---|---|
| EP | 1921800 A2 | 10/2007 |
| EP | 1926233 A1 | 11/2007 |
| EP | 1926233 A1 | 5/2008 |
| WO | 2008024158 A1 | 2/2008 |
| WO | 2010006113 A1 | 1/2010 |

OTHER PUBLICATIONS

Ryu, Hyun S., et al.; Title: Selective Cooperative Relaying in OFDMA-TDD System for Broadband Mobile Wireless Services; IEEE; May 11, 2008; pp. 2311-2315.

PCT Invitation to Pay Additional Fees (Partial Search Report); PCT Application No. PCT/US2010/038869; Oct. 14, 2010; 8 pgs.

PCT International Preliminary Report on Patentability; PCT Application No. PCT/US2010/038871; Jul. 15, 2011; 14 pgs.

3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.

3GPP TS 36.212 v8.6.0; 3rd Generation Partnership Project; Technical Specification Group Radio Access Network; Evolved Universal Terrestrial Radio Access (E-UTRA); Multiplexing and Channel Coding; Release 8; Mar. 2009; 59 pgs.

3GPP TS 36.304 v8.5.0; 3rd Generation Partnership Project; Technical Specification Group Radio Access Network; Evolved Universal Terrestrial Radio Access (E-UTRA); User Equipment (UE) Procedures in Idle Mode; Release 8; Mar. 2009; 30 pgs.

3GPP TS 36.321 v8.5.0; 3rd Generation Partnership Project; Technical Specification Group Radio Access Network; Evolved Universal Terrestrial Radio Access (E-UTRA); Medium Access Control (MAC) Protocol Specification; Release 8; Mar. 2009; 46 pgs.

3GPP TS 36.331 v8.5.0; 3rd Generation Partnership Project; Technical Specification Group Radio Access Network; Evolved Universal Terrestrial Radio Access (E-UTRA) Radio Resource Control (RRC); Protocol Specification; Release 8; Mar. 2009; 204 pgs.

Ericsson; TSG-RAN WG1 #53; Title: "A Discussion on Some Technology Components for LTE-Advanced;" R1-082024; Kansas City, MO, USA; May 5-9, 2008; 11 pgs.

Samsung; 3GPP TSG RAN WG1 Meeting #53bis; Title: "Application of Network Coding in LTE-Advanced Relay;" R1-082327; Warsaw, Poland; Jun. 30-Jul. 4, 2008; 4 pgs.

China Mobile, Vodafone, Huawei; TSG-RAN WG1 #54; Title: "Application Scenarios for LTE-Advanced Relay;" R1-082975; Jeju, Korea; Aug. 18-22, 2008; 7 pgs.

Qualcomm Europe; 3GPP TSG-RAN WG1 #54; Title: "Operation of Relays in LTE-A;" R1-083191; Jeju, S. Korea; Aug. 18-22, 2008; 5 pgs.

Motorola; TSG-RAN WG1 #54; Title: "Classification of Relays;" R1-083223; Jeju, South Korea; Aug. 18-22, 2008; 3 pgs.

Vodafone, CMCC, CHTTL, Alcatel-Lucent, Alcatel-Lucent Shanghai, Bells, CATT, HTC, ITRI, ZTE; 3GPP TSG RAN WG1 #56bis; Title: "Use Cases of Type II Relay;" R1-091624; Seoul, South Korea; Mar. 23-27, 2009; 5 pgs.

Qualcomm Europe; 3GPP TSG-RAN WG1 #57; Title: "Challenges with Type II Relay Operation;" R1-092058; San Francisco, USA; May 4-8, 2009; 3 pgs.

Pabst, Ralf et al.; Title: Relay-Based Deployment Concepts for Wireless and Mobile Broadband Radio; IEEE Communications Magazine; Sep. 2004; pp. 80-89.

Cai, Zhijun, et al.; U.S. Appl. No. 12/817,080; Title "Uplink Transmissions for Type 2 Relay"; filed Jun. 16, 2010.

PCT International Preliminary Report on Patentability; PCT Application No. PCT/US2010/038869; Oct. 10, 2011; 34 pgs.

Ryu, Hyun S., et al,; Title: Selective Cooperative Relaying in OFDMA-TDD System for Broadband Mobile Wireless Services; Vehicular Technology Conference; IEEE; May 11, 2008; pp. 2311-2315.

Can, Basak, et al.; Title: Efficient Cooperative Diversity Schemes and Radio Resource Allocation for IEEE 802.16j; IEEE Wireless Communications and Networking Conference; Mar. 31, 2008; pp. 36-41.

Esseling, Norbert; Title: Extending the Range of HiperLAN/2 Cells in Infrastructure Mode Using Forwarding Mobile Terminals; European Personal Mobile Communication Conference; Feb. 28, 2001; 7 pgs.

PCT International Search Report; PCT Application No. PCT/US2010/038869; Feb. 3, 2011; 7 pgs.

PCT Written Opinion of the International Searching Authority; PCT Application No. PCT/US2010/038869; Feb. 3, 2011; 11 pgs.

PCT International Search Report; PCT Application No. PCT/US2010/038871; Jan. 28, 2011; 4 pgs.

PCT Written Opinion of the International Searching Authority; PCT Application No. PCT/US2010/038871; Jan. 28, 2011; 6 pgs.

Office Action dated Jul. 20, 2012; U.S. Appl. No. 12/817,080, filed Jun. 16, 2010; 29 pages.

Office Action dated Feb. 14, 2013; U.S. Appl. No. 12/817,080, filed Jun. 16, 2010; 20 pages.

European Examination Report; Application No. 10729982.8; Feb. 21, 2013; 3 pages.

* cited by examiner

DOWNLINK TRANSMISSIONS FOR TYPE 2 RELAY

CROSS-REFERENCE TO RELATED APPLICATIONS

The present application claims priority to U.S. provisional patent application No. 61/218,907 filed Jun. 19, 2009, by Zhijun Cai, et al, entitled "Downlink Transmissions for Type 2 Relay" which is incorporated by reference herein as if reproduced in its entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) or evolved node B (eNB), a wireless access point, or a similar component rather than a traditional base station. As used herein, the term "access node" will refer to any component of the wireless network, such as a traditional base station, a wireless access point, or an LTE or LTE-A eNB, that creates a geographical area of reception and transmission coverage allowing a UA or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may be used serially to extend or enhance coverage created by an access node.

These systems can include protocols such as a Radio Resource Control (RRC) protocol, which is responsible for the assignment, configuration, and release of radio resources between a UA and a network node or other equipment. The RRC protocol is described in detail in the Third Generation Partnership Project (3GPP) Technical Specification (TS) 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
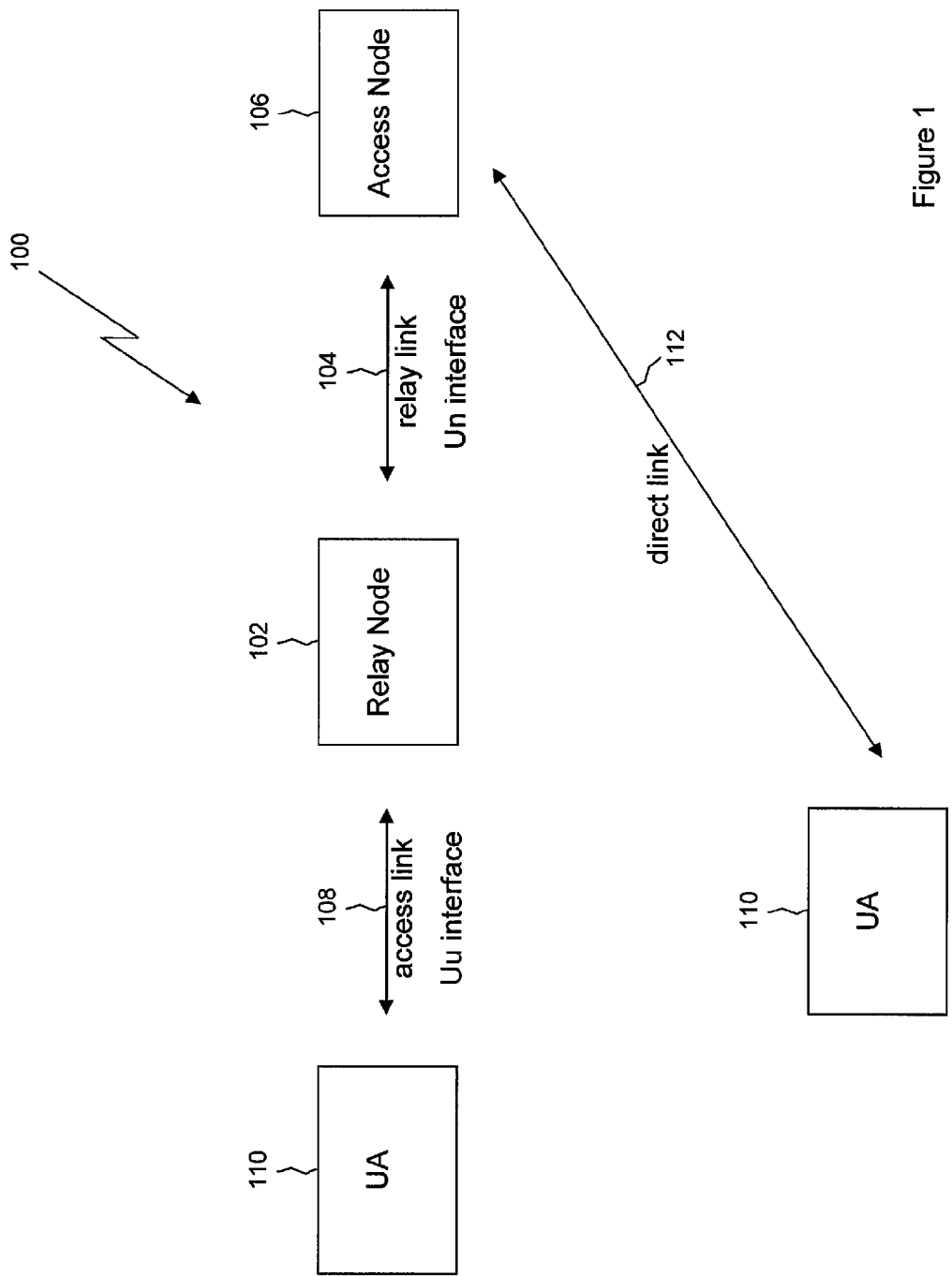
FIG. 1 is a diagram illustrating a wireless communication system that includes a relay node, according to an embodiment of the disclosure.

FIG. 1 is a diagram illustrating a wireless communication system 100 that includes a relay node 102, according to an embodiment of the disclosure. Examples of the wireless communication system 100 include LTE or LTE-A networks, and all of the disclosed and claimed embodiments could be implemented in an LTE-A network. The relay node 102 can receive and amplify a signal received from a UA 110 and transmit the signal to an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110.

The relay node 102 might be placed near the edges of a cell so that the UA 110 can communicate with the relay node 102 rather than communicating directly with the access node 106 for that cell. In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within a cell or to extend the size of coverage of a cell. Additionally, the use of a relay node 102 can enhance throughput of a signal within a cell because the UA 110 can access the relay node 102 at a higher data rate than the UA 110 might get when communicating directly with the access node 106 for that cell, thus creating higher spectral efficiency. The use of a relay node 102 can also decrease the UA's battery usage by allowing the UA 110 to transmit at a lower power.

Relay nodes can be divided into three kinds: layer one relay nodes, layer two relay nodes, and layer three relay nodes. A layer one relay node is essentially a repeater that can retransmit a transmission without any modification other than amplification and slight delay. A layer two relay node can demodulate/decode a transmission that it receives, re-encode/modulate the demodulated/decoded data, and then transmit the re-encoded/modulated data. A layer three relay node can have full radio resource control capabilities and can thus function similarly to an access node. The illustrative embodiments herein are primarily concerned with layer two and layer three relay nodes.

The radio resource control protocols used by a relay node may be the same as those used by an access node, and the relay node may have a unique cell identity typically used by an access node. Relay nodes known as Type 1 relay nodes have their own physical cell IDs and transmit their own synchronization signals and reference symbols. Relay nodes known as Type 2 relay nodes do not have separate cell IDs and thus would not create any new cells. That is, a Type 2 relay node does not transmit a physical ID that is different from the eNB ID. A type 2 relay node should be able to relay to and from legacy (LTE Release 8) UAs and legacy UAs should not be aware of the presence of a Type 2 relay node. In some cases, the embodiments described herein may preferably be implemented in Type 2 relay nodes.

When the UA 110 is communicating with the access node 106 via the relay node 102, the links that allow wireless communication can be said to be of three distinct types. The communication link between the UA 110 and the relay node 102 is said to occur over an access link 108, which can also be referred to as the Uu interface. The communication between the relay node 102 and the access node 106 is said to occur over a relay link 104, which can also be referred to as the Un interface. Communication that passes directly between the UA 110 and the access node 106 without passing through the relay node 102 is said to occur over a direct link 112.

In an embodiment, the access node 106 and the relay node 102 transmit the same information simultaneously on the downlink to the UA 110. This results in the data signals from the access node 106 and the relay node 102 combining coherently, which can improve the quality of the signal received by the UA 110. The improved signal quality can increase the likelihood that the UA 110 will be able to decode the data it receives and can therefore decrease the likelihood that a retransmission of the data will be needed. In addition, the improved signal quality may increase the achievable data throughput rates. Alternatively, different space time coded versions of the same information bits may be sent from the access node 106 and the relay node 102, resulting in coded diversity advantage at the UA 110.

In an embodiment, the access node 106 makes an initial transmission to the relay node 102 that includes both the data that is to be transmitted to the UA 110 and control information that specifies when and how the data is to be transmitted to the UA 110. That is, the access node 106 might notify the relay node 102 to use the previously received control information for an assisted transmission. The control information might include modulation and coding information, resource allocation information, scheduling information, a subframe index, and other information that might typically be associated with a downlink transmission from the access node 106 to the UA 110. Any such information will be referred to herein as control information. If a common reference signal (CRS) is used, the control information might include physical downlink control channel (PDCCH) transmission-related information such as the number of orthogonal frequency division multiplexing (OFDM) symbols in the control region and the aggregation level. In addition to the control information, the initial transmission to the relay node 102 includes the data that is to be transmitted to the UA 110. This data might be a medium access control (MAC) protocol data unit (PDU), a physical layer (PHY) transport block, or a similar data packet. Any such packet will be referred to herein as data.

After sending the control information and the data to the relay node 102, the access node 106 transmits the data and control information a second time, following the transmission parameters included in the control information. Since the relay node 102 has the control information, which includes the time at which the access node 106 is transmitting the data the second time, the relay node 102 can transmit the data at the same time the access node 106 is transmitting the data the second time and can transmit the same control information that the access node 106 is transmitting. In this way, the access node 106 and the relay node 102 can transmit the data and control information to the UA 110 in the same subframe using the same transmission parameters. If a dedicated reference signal (DRS) is used, the simultaneous transmissions might use transmission mode 7 of LTE. If the CRS is used, the access node 106 and the relay node 102 may transmit the physical downlink control channel (PDCCH) to the UA 110 in the same subframe using the same transmission parameters. In another alternative, if the CRS is used, the access node 106 and the relay node 102 may transmit another control channel, such as the Physical Broadcast Channel or the Physical hybrid automatic repeat request (HARQ) Indicator Channel, to the UA 110 in the same subframe using the same transmission parameters.

A Release-8 UA might see only the CRS from the access node 106 and hence the reported channel quality indicator (CQI) might not represent the channel quality of combined link from the access node 106 and the relay node 102. In an embodiment, the access node 106 can use a boosted CQI value for scheduling. The amount of boosting, denoted by delta, depends on the link quality between RN and UE. The access node 106 could get an estimate of delta value based on the long-term channel condition between the relay node 102 and the UA 110 (e.g., path loss). The access node 106 could further adjust the delta value based on a target packet error rate.

The UA 110 may or may not be able to successfully decode the transmissions from the access node 106 and the relay node 102. If the UA 110 can decode the transmissions, the UA 110 sends an acknowledgement (ACK) message to the access node 106 and the relay node 102. If the UA 110 cannot decode the transmissions, the UA 110 sends a negative acknowledgement (NACK) message to the access node 106 and the relay node 102. Upon receiving a NACK from the UA 110, the access node 106 and the relay node 102 retransmit the data.

The procedures for the retransmission differ depending on whether dynamically scheduled HARQ retransmissions or non-adaptive synchronously scheduled HARQ retransmissions have been specified. Dynamically scheduled HARQ transmission is a protocol whereby the time that a transmission is to occur and other parameters associated with the transmission are specified at approximately the time that the transmission is to occur. Different transmissions might have different sets of parameters. Non-adaptive synchronously scheduled HARQ transmission is a protocol whereby transmissions occur at pre-specified times using pre-specified parameters. The same set of parameters might be used for multiple transmissions.

In an embodiment, when dynamically scheduled HARQ transmission is being used and the access node 106 and the relay node 102 receive a NACK from the UA 110, the access node 106 determines the parameters (such as the modulation and coding scheme, the precoding matrix index, and the resource blocks) that will be used for the retransmission and the time that the retransmission will occur. The access node 106 then notifies the relay node 102 of those parameters and that time. The access node 106 and the relay node 102 then retransmit the data at the time specified by the access node 106 using the parameters specified by the access node 106.

In an embodiment, when non-adaptive synchronously scheduled HARQ transmission is being used and the access node 106 and the relay node 102 receive a NACK from the UA 110, the access node 106 does not need to signal the retransmission information to the relay node 102 since the retransmission occurs at a fixed time with the same parameters that were used on the original transmission. The access node 106 and the relay node 102 retransmit the data at the pre-specified time using the pre-specified parameters.

If non-adaptive synchronous HARQ retransmissions are used on the Uu interface between the UA 110 and the relay node 102, the messaging on the Un interface between the relay node 102 and the access node 106 could be reduced. This could reduce the backhaul (Un) load and simplify cooperative retransmissions from the relay node 102 and the access node 106. However, in LTE Release 8, downlink transmissions are based on dynamically scheduled HARQ retransmissions, and the Release 8 UAs are able to receive downlink retransmissions only when the retransmission timing and other retransmission parameters are scheduled by the access node 106 over the PDCCH.

In an embodiment, the access node 106 informs the relay node 102 that a non-adaptive synchronous HARQ retransmission will occur between the access node 106 and the relay node 102. More specifically, the access node 106 informs the relay node 102 that the same control information that was used for the original transmission will be used for the retransmission. The access node 106 might enable non-adaptive synchronous HARQ retransmission in the relay node 102 using, for example, radio resource control signaling, MAC control elements, or PDCCH-based signaling. In addition, the access node 106 informs the UA 110, through explicit PDCCH signaling, of the retransmission timing and other retransmission parameters that will be used for the retransmission. In one embodiment, both the access node 106 and the relay node 102 transmit the PDCCH to the UA 110. That is, rather than simply notifying the UA 110 that the same control information that was used for the original transmission will be used for the retransmission, the access node 106, and possibly the relay node 102 in one specific embodiment, informs the UA 110, through PDCCH signaling, of the specific timing and parameters that will be used for the retransmission. The specific control information, such as the modulation scheme, allocated resources, etc., may be identical to the control information in the original transmission. The redundancy version may be different but should follow a pre-specified pattern which is known to both the access node 106 and the relay node 102. The access node 106 could signal the pre-specified redundancy version pattern to the relay node 102 via the relay link. This allows efficient, non-adaptive synchronous retransmission to be used between the access node 106 and the relay node 102 and allows legacy UAs to receive a dynamically scheduled retransmission.

In the PDCCH-based solution, a one-bit indicator field can be added to the downlink control information (DCI) format to enable or disable non-adaptive synchronous HARQ retransmission. If this bit is a first value (for example "0"), non-adaptive synchronous HARQ retransmission is turned off in the relay node 102, and if this bit is a second value (for example "1"), non-adaptive synchronous HARQ retransmission is turned on in the relay node 102. The access node 106, and possibly the relay node 102 in one specific embodiment, transmits PDCCH signaling to provide the UA 110 with the retransmission information. So from the perspective of the UA 110, the resources for HARQ retransmissions are dynamically scheduled. This allows legacy UAs to receive the retransmitted data. However, the control information contained in the PDCCH signaling for the retransmission is the same as in the initial transmission. This allows the more efficient non-adaptive synchronous retransmission technique to be used between the access node 106 and the relay node 102. In this way, backward compatibility with legacy UAs can be maintained, and non-adaptive synchronous retransmission for the relay node 102 can be easily implemented.

In an embodiment, the control information that is passed from the access node 106 to the relay node 102 is transmitted in the MAC layer. In an embodiment, the data structure of the MAC layer between the access node 106 and the relay node 102 is modified to accommodate the control information. More specifically, several fields that are typically transmitted at the physical layer in the PDCCH are transmitted in the modified MAC layer. In addition, at least one field that is not included in the PDCCH is included in the modified MAC layer. In the following discussion of these fields, the access node 106 sends a transport block to the relay node 102 in subframe k; that is, at least M subframes before the transport block's packet delay budget (PDB) deadline. In an embodiment, the fields are transmitted in a modified MAC protocol and at least include the following: N_OFDM, C-RNTI, L, PDCCH (PDCCH-UE-i), PDCCH (C-RNTI-UE-i), and DATA-UE-i.

N_OFDM is the number of OFDM symbols of the control region in the k+Mth subframe (fixed length field). This field is sent only once in a frame. This value is used to configure the control symbols used in the k+Mth sub-frame and also to form the physical control format indicator channel (PCFICH). C-RNTI is the field to identify the UA-i's cell radio network temporary identifier (C-RNTI). L is the length of DATA field. PDCCH (PDCCH-UE-i) is the descriptor for the control channel element (CCE) location and aggregation level for transmitting the PDCCH over the air in the k+Mth sub-frame. The length of this field is fixed. This field may not be present in cases where the DRS is used. PDCCH (C-RNTI-UE-i) is the PDCCH content transmitted over the air in the k+Mth sub-frame. The length of this field is identified by the DCI format field present in the PDCCH (PDCCH-UE-i) field. DATA-UE-i is the data burst to be transmitted in the k+Mth sub-frame in the form of MAC PDU(s) (which can consist of both data payload as well as MAC control elements from the access node to the UE). The length is identified by the Length field.

In addition to these fields, a new field that can be referred to as MD-UE-i is included in the modified MAC layer. MD-UE-i is the mode descriptor for the ith UE to be used in the k+Mth sub-frame. When synchronous transmissions are scheduled, the relay node and access node may employ joint coding, spatial multiplexing, and/or other transmission mode-related techniques to obtain performance gain at the UE. This field indicates the transmission mode to be employed for the transmission in the k+Mth sub-frame. In addition, an Extension field might include an indicator to identify whether another user's fields will be sent.

In an embodiment, relay-assisted UAs and non-relay-assisted UAs may be segregated into separate groups for scheduling purposes. Since data and/or control information for eventual transmissions to a UA must be communicated in advance to relay nodes, the corresponding scheduling of such UA transmissions should also be performed further in advance of when such scheduling would normally be performed at the access node. This may place greater constraints on the dynamic scheduling flexibility of the eNB for non-relay-assisted UAs, including its ability to react quickly to new traffic and/or requested retransmissions, thereby potentially increasing the latency of data transmissions to/from non-relay-assisted UAs and thus degrading their observable performance.

Certain subframes could be reserved for relay-assisted UAs. Different embodiments of this approach would include using a pre-determined subframe pattern or else having the access node dynamically reserve relay-assisted subframes as required. Relay-assisted subframes would be scheduled further in advance, so that there would be sufficient time to communicate the relevant information to one or more relay nodes for eventual coordinated transmission by the access node and the relay node or nodes to the relay-assisted UAs. Subframes for non-relay assisted UAs would be scheduled as normal (i.e., not as far in advance), so that the access node could react to instantaneous traffic conditions and requested data retransmissions with maximum flexibility. It should be noted that non-relay-assisted UAs could be included in relay-assisted subframes, in order to ensure that all transmission resources were fully utilized (e.g., if there were insufficient transmissions for relay-assisted UAs to fill the subframe). However, relay-assisted UAs could not be scheduled into non-relay-assisted subframes, since there would be insufficient time to communicate the relevant scheduling and content information of these subframes to the relay nodes prior to the eventual transmission to the UA.

Figure 2:
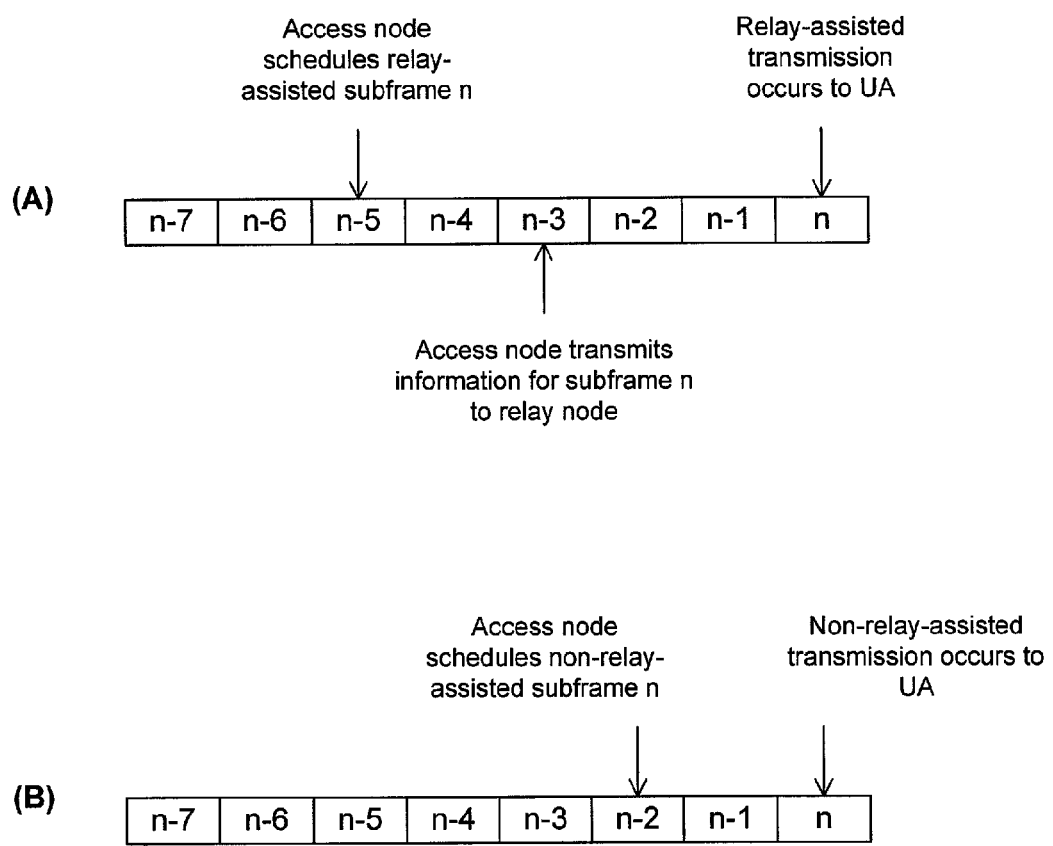
FIG. 2 is a diagram illustrating a segregated scheduling method according to an embodiment of the disclosure.

FIG. 2 illustrates an example embodiment of the above segregated scheduling method. Part (A) of the figure illustrates the scheduling and transmission of relay-assisted subframe n. The scheduling and construction of the subframe contents occur at a time equivalent to subframe n-5. All of the necessary information is then transmitted to the relay node at subframe n-3. The access node and relay node then perform a coordinated transmission to the UA at subframe n.

Part (B) of FIG. 2 illustrates the scheduling and transmission of non-relay-assisted subframe n. The scheduling and construction of the subframe contents occur during subframe n-2. The access node then performs a direct transmission to the UA at subframe n. As can be seen from this figure, a relay-assisted subframe must be scheduled at least three subframes further in advance (in this particular example) than a non-relay-assisted subframe. Certain HARQ retransmission requests for previously transmitted data may not be available at that time, for instance, which would lead to increased delay in performing those retransmissions.

Figure 3:
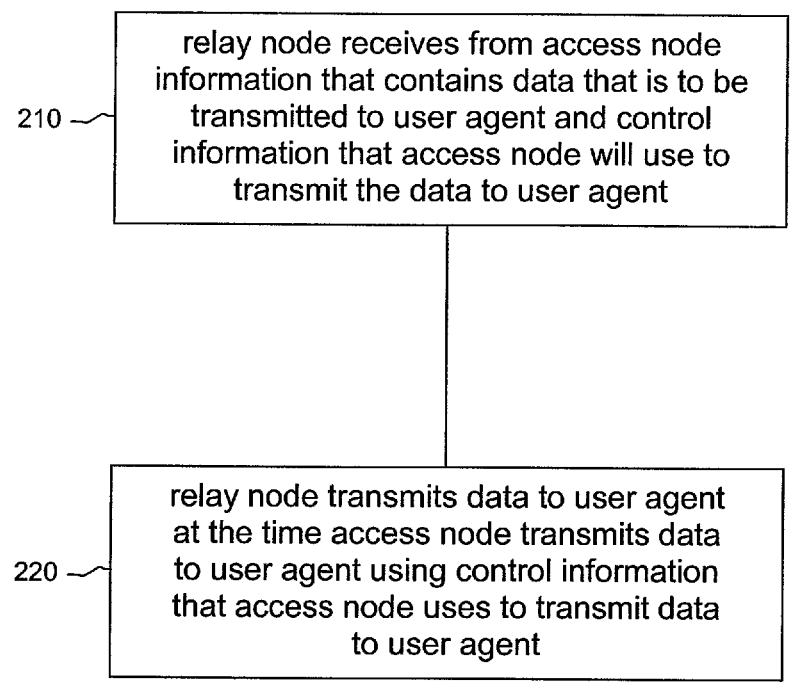
FIG. 3 is a block diagram of a method for transmitting data to a UA according to an embodiment of the disclosure.

FIG. 3 illustrates an embodiment of a method for transmitting data to a UA. In block 210, a relay node receives information from an access node. The information contains the data that is to be transmitted to the UA and control information that the access node will use to transmit the data to the UA. In block 220, the relay node transmits the data to the UA at the time the access node transmits the data to the UA. The relay node uses the control information that the access node uses to transmit the data to the UA.

While the above discussion has focused on transmissions and retransmissions to a single UA, it should be understood that the above considerations could apply to transmissions and retransmissions to a plurality of UAs.

Figure 4:
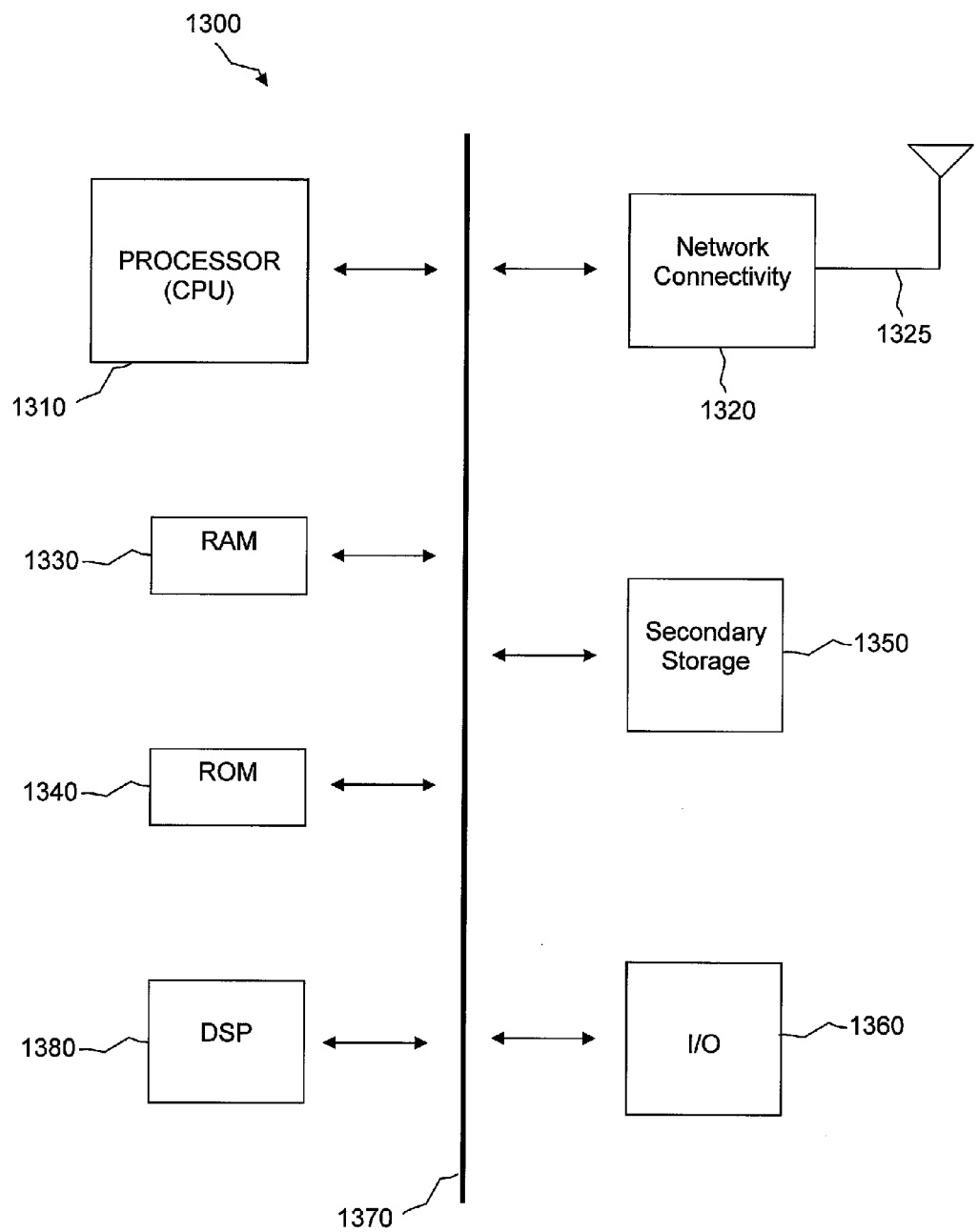
FIG. 4 illustrates a processor and related components suitable for implementing the several embodiments of the present disclosure.

The UA 110, the relay node 102, the access node 106, and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320. Various components of the system 1300 may be referred to herein, either alone or in combination, as "component" or "components".

In an embodiment, a method is provided for transmitting data to a user agent. The method includes a relay node receiving information from an access node. The information contains the data that is to be transmitted to the user agent and control information that the access node will use to transmit the data to the user agent. The method further includes the relay node transmitting the data to the user agent at the time the access node transmits the data to the user agent. The relay node uses the control information that the access node uses to transmit the data to the user agent In another embodiment, an access node in a wireless telecommunications system is provided. The access node includes a component configured such that the access node transmits information containing data that is to be transmitted to a user agent by a relay node and control information, wherein the control information useable by the relay node to coordinate transmission of the data to the user agent with the access node transmission of the data to the user agent.

In another embodiment, a relay node in a wireless telecommunications system is provided. The relay node includes a component configured such that the relay node receives information containing data that is to be transmitted to a user agent and control information, wherein the relay node uses the control information to coordinate transmission of the data to the user agent with an access node transmission of the data to the user agent.

In another embodiment, a method is provided for scheduling data to and/or from a user agent. The method includes an access node separating relay-assisted and non-relay-assisted user agents into different groups. The method further includes the access node performing scheduling for the two groups separately.

The following are incorporated herein by reference for all purposes: 3rd Generation Partnership Project (3GPP) Technical Specification (TS) 36.814, 3GPP TS 36.331, 3GPP TS 36.212, and 3GPP TS 36.321.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for transmitting data to a user agent, comprising:
    a relay node receiving information from an access node, the information containing the data to be transmitted to the user agent and control information the access node will use to transmit the data to the user agent; and
    the relay node transmitting the data to the user agent at the time the access node transmits the data to the user agent, the relay node using the control information that the access node uses to transmit the data to the user agent.

2. The method of claim 1, wherein the data is at least one of:
    physical downlink control channel (PDCCH) content information;
    a medium access control (MAC) protocol data unit (PDU); and
    a physical layer (PHY) transport block.

3. The method of claim 1, wherein the control information is at least one of:
    modulation and coding information;
    resource allocation information;
    scheduling information;
    a number of orthogonal frequency division multiplexing symbols;
    an aggregation level;
    a subframe index for the transmission to the user agent;
    a location of corresponding downlink control information (DCI) on the PDCCH; and
    the identity of the user agent.

4. The method of claim 1, wherein, when the user agent is unable to successfully decode the data, the user agent sends a negative acknowledgement (NACK) message to the access node and the relay node.

5. The method of claim 4, wherein, when the access node and the relay node receive the NACK and when dynamic scheduling is used, the access node determines the parameters that are to be used for a retransmission of the data and a time of the retransmission, the access node notifies the relay node of the parameters and the time, and the access node and the relay node retransmit the data at the time determined by the access node using the parameters specified by the access node.

6. The method of claim 4, wherein, when the access node and the relay node receive the NACK and when non-adaptive synchronous scheduling is used, the access node and the relay node retransmit the data at the same time using the same control information that was used in the previous transmission of the data.

7. The method of claim 6, wherein the access node provides the user agent with the control information over the PDCCH that will be used for the retransmission, and wherein the control information used for the retransmission is the same as the control information used for the original transmission.

8. The method of claim 7, wherein the access node informs the relay node to use the same control information that was used in the previous transmission of the data for the retransmission.

9. The method of claim 1, wherein the access node transmits the control information in the medium access control (MAC) layer.

10. The method of claim 9, wherein the control information that is transmitted from the access node to the relay node in the MAC layer includes at least one of:
   an N_OFDM field;
   a C-RNTI field;
   a length field;
   a PDCCH (PDCCH-UE-i) field;
   a PDCCH (C-RNTI-UE-i) field; and
   a DATA-UE-i field.

11. The method of claim 9, wherein the control information that is transmitted in the MAC layer includes a field specifying a transmission mode to be used between the access node and the relay node.

12. An access node in a wireless telecommunications system, comprising:
   a component configured to transmit information containing data to be transmitted to a user agent by a relay node and control information, wherein the control information is useable by the relay node to coordinate transmission of the data to the user agent with the access node transmission of the data to the user agent.

13. The access node of claim 12, wherein the data is at least one of:
   physical downlink control channel (PDCCH) content information;
   a medium access control (MAC) protocol data unit (PDU); and
   a physical layer (PHY) transport block.

14. The access node of claim 12, wherein the control information is at least one of:
   modulation and coding information;
   resource allocation information;
   scheduling information;
   a number of orthogonal frequency division multiplexing symbols;
   an aggregation level;
   a subframe index for the transmission to the user agent;
   a location of corresponding downlink control information (DCI) on the PDCCH; and
   the identity of the user agent.

15. The access node of claim 12, wherein, when the user agent is unable to successfully decode the data, the user agent sends a negative acknowledgement (NACK) message to the access node and the relay node.

16. The access node of claim 15, wherein, when the access node and the relay node receive the NACK and when dynamic scheduling is used, the access node determines the parameters that are to be used for a retransmission of the data and a time of the retransmission, the access node notifies the relay node of the parameters and the time, and the access node and the relay node retransmit the data at the time determined by the access node using the parameters specified by the access node.

17. The access node of claim 15, wherein, when the access node and the relay node receive the NACK and when non-adaptive synchronous scheduling is used, the access node and the relay node retransmit the data at the same time using the same control information that was used in the previous transmission of the data.

18. The access node of claim 17, wherein the access node provides the user agent with the control information over the PDCCH that will be used for the retransmission, and wherein the control information used for the retransmission is the same as the control information used for the original transmission.

19. The access node of claim 18, wherein the access node informs the relay node to use the same control information that was used in the previous transmission of the data for the retransmission.

20. The access node of claim 12, wherein the access node transmits the control information in the medium access control (MAC) layer.

21. The access node of claim 20, wherein the control information that is transmitted from the access node to the relay node in the MAC layer includes at least one of:
   an N_OFDM field;
   a C-RNTI field;
   a length field;
   a PDCCH (PDCCH-UE-i) field;
   a PDCCH (C-RNTI-UE-i) field; and
   a DATA-UE-i field.

22. The access node of claim 20, wherein the control information that is transmitted in the MAC layer includes a field specifying a transmission mode to be used between the access node and the relay node.

23. A relay node in a wireless telecommunications system, comprising:
   a component configured such that the relay node receives information containing data to be transmitted to a user agent and control information, wherein the relay node uses the control information to coordinate transmission of the data to the user agent with an access node transmission of the data to the user agent.

24. The relay node of claim 23, wherein the data is at least one of:
   physical downlink control channel (PDCCH) content information;
   a medium access control (MAC) protocol data unit (PDU); and
   a physical layer (PHY) transport block.

25. The relay node of claim 23, wherein the control information is at least one of:
   modulation and coding information;
   resource allocation information;
   scheduling information;
   a number of orthogonal frequency division multiplexing symbols;
   an aggregation level;
   a subframe index for the transmission to the user agent;
   a location of corresponding downlink control information (DCI) on the PDCCH; and
   the identity of the user agent.

26. The relay node of claim 23, wherein, when the user agent is unable to successfully decode the data, the user agent sends a negative acknowledgement (NACK) message to the access node and the relay node.

27. The relay node of claim 26, wherein, when the access node and the relay node receive the NACK and when dynamic scheduling is used, the access node determines the parameters that are to be used for a retransmission of the data and a time of the retransmission, the access node notifies the relay node of the parameters and the time, and the access node and the relay node retransmit the data at the time determined by the access node using the parameters specified by the access node.

28. The relay node of claim 26, wherein, when the access node and the relay node receive the NACK and when non-adaptive synchronous scheduling is used, the access node and the relay node retransmit the data at the same time using the same control information that was used in the previous transmission of the data.

29. The relay node of claim 28, wherein the access node provides the user agent with the control information over the PDCCH that will be used for the retransmission, and wherein the control information used for the retransmission is the same as the control information used for the original transmission.

30. The relay node of claim 29, wherein the access node informs the relay node to use the same control information that was used in the previous transmission of the data for the retransmission.

31. The relay node of claim 23, wherein the relay node receives the control information in the medium access control (MAC) layer.

32. The relay node of claim 31, wherein the control information that is transmitted from the access node to the relay node in the MAC layer includes at least one of:
   an N_OFDM field;
   a C-RNTI field;
   a length field;
   a PDCCH (PDCCH-UE-i) field;
   a PDCCH (C-RNTI-UE-i) field; and
   a DATA-UE-i field.

33. The relay node of claim 31, wherein the control information that is transmitted in the MAC layer includes a field specifying a transmission mode to be used between the access node and the relay node.

34. A method for scheduling data at least one of to a user agent and from a user agent, comprising:
   an access node separating relay-assisted and non-relay-assisted user agents into two groups; and
   the access node performing scheduling for the two groups separately.

35. The method of claim 34, wherein the relay-assisted group of user agents is scheduled further in advance of the corresponding time for transmission to the user agent than is the non-relay-assisted group of user agents.

36. The method of claim 35, wherein the advance scheduling allows time for communication of the corresponding relay-assisted scheduling information to one or more relay nodes.

37. The method of claim 34, wherein relay-assisted user agents are only scheduled into relay-assisted subframes, but non-relay-assisted user agents may be scheduled into either non-relay-assisted or relay-assisted subframes.

38. The method of claim 37, wherein relay-assisted subframes are dynamically reserved by the access node.

39. The method of claim 37, wherein relay-assisted subframes occur according to a pre-determined pattern.

40. An access node in a wireless telecommunications system, comprising:
   a component configured to transmit control information useable by a relay node to coordinate relay node transmission of data to a user agent with access node transmission of the data to the user agent, wherein the access node uses a boosted channel quality indicator value for scheduling.

41. The access node of claim 40, wherein the amount of boosting depends on the link quality between relay node and the user agent.

42. The access node of claim 40, wherein the access node estimates the amount of boosting based on the long-term channel condition between the relay node and the user agent.

43. The access node of claim 40, wherein the access node adjusts the amount of boosting based on a target packet error rate.

* * * * *